(12) United States Patent
Keithley et al.

(10) Patent No.: US 8,379,988 B1
(45) Date of Patent: Feb. 19, 2013

(54) IMAGE PROCESSING USING STABILITY CRITERIA FOR PIXEL WINDOWS

(75) Inventors: Douglas G. Keithley, Boise, ID (US); Roy G. Moss, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 816 days.

(21) Appl. No.: 12/481,453

(22) Filed: Jun. 9, 2009

Related U.S. Application Data

(63) Continuation-in-part of application No. 12/042,106, filed on Mar. 4, 2008, now Pat. No. 7,587,096.

(60) Provisional application No. 61/077,369, filed on Jul. 1, 2008.

(51) Int. Cl.
*G06K 9/56* (2006.01)
*G06T 5/00* (2006.01)

(52) U.S. Cl. ....... 382/205; 382/254; 358/3.23; 358/3.27

(58) Field of Classification Search .................. 382/205, 382/254; 358/3.23, 3.24, 3.27
See application file for complete search history.

(56) References Cited

U.S. PATENT DOCUMENTS

| 4,941,190 | A * | 7/1990 | Joyce | 382/264 |
| 7,340,105 | B2 * | 3/2008 | Keithley et al. | 382/254 |
| 7,587,096 | B2 * | 9/2009 | Keithley et al. | 382/254 |

* cited by examiner

*Primary Examiner* — Jon Chang

(57) ABSTRACT

Some of the embodiments of the present disclosure provide a method comprising selecting a pixel window of image data, the pixel window including a target pixel, determining a stability of the pixel window, formulating a look up table address based at least in part on the determined stability, obtaining one or more image enhancement values from a look up table based at least in part on the formulated look up table address, and processing the target pixel based at least in part on the obtained one or more image enhancement values. Other embodiments are also described and claimed.

20 Claims, 4 Drawing Sheets

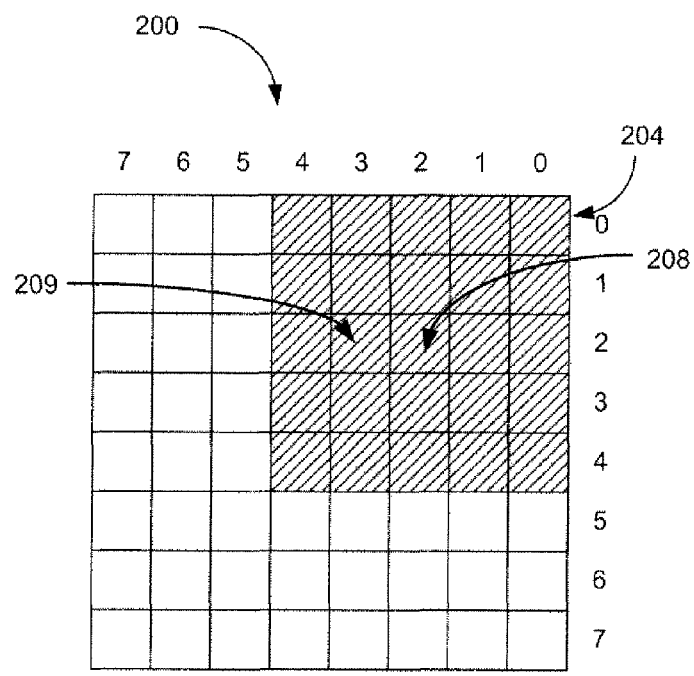
Fig. 2a
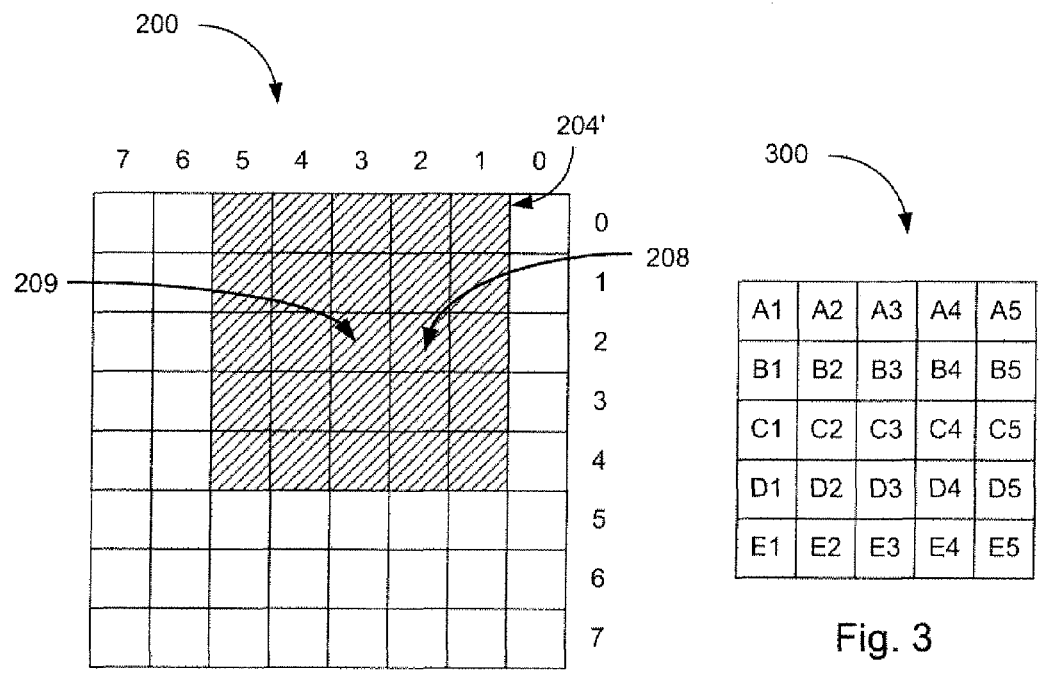
Fig. 2b
Fig. 3

IMAGE PROCESSING USING STABILITY CRITERIA FOR PIXEL WINDOWS

CROSS REFERENCE TO RELATED APPLICATIONS

The present application claims priority to U.S. patent application Ser. No. 61/077,369 filed Jul. 1, 2008, entitled "REDUCED LUT SIZE WITH INDEPENDENT HORIZONTAL AND VERTICAL STABILITY CRITERION," and is a Continuation-in-Part of U.S. patent application Ser. No. 12/042,106 (now issued U.S. Pat. No. 7,587,096) filed Mar. 4, 2008, entitled "METHOD AND APPARATUS FOR IMAGE PROCESSING," which is a continuation of and claims priority to U.S. patent application Ser. No. 10/938,098 (now issued U.S. Pat. No. 7,340,105) filed Sep. 10, 2004, entitled "METHOD AND APPARATUS FOR IMAGE PROCESSING," the entire specifications of which are hereby incorporated by reference in their entirety for all purposes, except for those sections, if any, that are inconsistent with this specification.

TECHNICAL FIELD

Embodiments of the present invention relate to image processing, and more particularly, to image processing using stability criteria for pixel windows.

BACKGROUND

Generally, printers are available as monochrome only printers, such as printers that print only in gray and black, or color printers that print in color as well as monochrome. These printers generally operate by converting an image on a client device, such as a personal computer, into data that may be received by a formatter included in the printer. The formatter may generate coded data representing the image, which may be then transmitted by the formatter to a print engine that drives the mechanisms of the printer to convert the data back into an image that is printed on a print medium, such as paper.

Printing devices generally utilize a two-dimensional matrix of image elements or pixels. Each pixel in a color image matrix, for example, may comprise Red ("R"), Green ("G"), and Blue ("B") cells. Each such cell may be represented by a corresponding memory cell that may store a numeric value. A computer program may then cause a particular pixel to be printed in any visible color, or to appear black or white, by setting the numeric values of its red, green, and blue cells to appropriate values for the printer.

In many products and applications, pixel information of a pixel may be processed (e.g., interpolated or amended) by a processing unit (e.g., a formatter included in the printer) based on, for example, pixel information of one or more neighboring pixels, as is well known to those skilled in the art. This processing of the pixel information may improve the overall quality of the printed image produced by the printer. Depending upon the type of printer being utilized, the processing may be used, for example, to remove artifacts from an image that could cause problems, such as "toner explosion" (toner explosion refers to toner that is scattered when moisture in the media suddenly vaporizes). The processing may also be used to calibrate the image information for the printer to adjust for particular printer characteristics, so that the final printed image faithfully reproduces the original image. The processing may also be used to enhance the printed image to improve it over the original image, for example, by the removal of "red eye" in a photograph. Other types of processing to enhance the printed image quality may also be easily envisioned by those skilled in the art. For the purpose of this disclosure, in various embodiments, any such processing (e.g., artifact removal, red-eye removal, image calibration, resolution enhancement, etc.) may be referred herein as image enhancement processing.

In various embodiments, such image enhancement processing may be performed serially on the image data on a pixel-by-pixel basis. For example, the pixels may be individually windowed by selecting a small window or matrix of the pixels that surround a selected pixel that is being processed. The processing on the selected pixel may be then based at least in part on the values of the surrounding pixels. Once the processing of the selected pixel is over, the process may be repeated for another pixel.

Generally, for each type of image enhancements, a complete table of all possible windows may be stored in a printer memory. The table may serve as a look up table (LUT). A printer processing unit may match the window of a target pixel (i.e., the selected pixel for which the processing is to be currently performed) to a corresponding entry in the LUT to obtain instructions, from that matching LUT pattern, for optimizing (e.g., correcting or amending) the value of the target pixel. Thus, each LUT may need to store all possible combinations of such pixel windows. Each such LUT may therefore be very large (based at least in part on the size of the pixel window) and may require a large amount of memory. For example, a 5-row by 3-column LUT may have 32,768 (i.e., $2^{15}$) entries and a 5-row by 5-column LUT may have 33,554,432 (i.e., $2^{25}$) entries.

As the speed of the printer may depend in part on the speed of the image enhancement processing, it may be desired to accomplish such processing in a relatively speedy manner. Accordingly, it may be desirable to store the LUT in relatively faster memory. For example, it may be desirable to store the LUT in a processor cache. However, the relatively large size of the LUT may prohibit the storing of the LUT in the cache. Thus, to support ever increasing printer operating speeds, some of the prior solutions have resorted to expensive and specialized hardware solutions, such as large, dedicated, high-speed memories (e.g., high-speed random access memories or RAMs). A need remains for faster, more efficient, and less expensive methods and mechanisms for optimizing memory utilization, especially processor cache memory utilization, for image processing and storing the LUT.

SUMMARY

In various embodiments, the present disclosure provides an apparatus and a method for image processing stability criterion using pixel windows. More specifically, there is provided according to various embodiments, a method comprising selecting a pixel window of image data, the pixel window including a target pixel, determining a stability of the pixel window, formulating a look up table address based at least in part on the determined stability, obtaining one or more image enhancement values from a look up table based at least in part on the formulated look up table address, and processing the target pixel based at least in part on the obtained one or more image enhancement values. The determining the stability may further comprise determining a horizontal stability and/or a vertical stability of the pixel window. The determining the stability may further comprise determining whether the pixel window is horizontally stable (HStable), vertically stable (VStable), horizontally and vertically stable (HVStable), or unstable. The pixel window may include a plurality of rows, and wherein the determining the stability may further comprise determining a horizontal stability of the pixel window if each of the plurality of rows is a constant row. The pixel window may include a first row and a first plurality of rows, the first row including the target pixel, the first plurality of rows excluding the first row, and wherein the determining the stability may further comprise determining a horizontal stability of the pixel window if each of the first plurality of rows is a constant row.

In various embodiments, the method may further comprise setting a row flag associated with the first row to indicate that the first row need not necessarily be a constant row for the pixel window to be horizontally stable. The pixel window may include a first plurality of rows including a first row, and wherein the determining the stability may further comprise determining that each of the first plurality of rows, excluding the first row, is a constant row, setting a row flag associated with the first row to indicate that the first row need not necessarily be a constant row for the pixel window to be horizontally stable, identifying the pixel window as being horizontally stable, based at least in part on determining that each of the first plurality of rows, excluding the first row, is a constant row and based at least in part on setting the row flag associated with the first row. The pixel window may include a plurality of columns, and wherein the determining the stability may further comprise determining a vertical stability of the pixel window if each of the plurality of columns is a constant column.

In various embodiments, the pixel window may include a first column and a first plurality of columns, the first column including the target pixel, the first plurality of column excluding the first column, and wherein the determining the stability may further comprise determining a vertical stability of the pixel window if each of the first plurality of first columns is a constant column. The pixel window may include a first plurality of columns including a first column, and wherein the determining the stability may further comprise determining that each of the first plurality of columns, excluding the first column, is a constant column, setting a column flag associated with the first column to indicate that the first column need not necessarily be a constant row for the pixel window to be vertically stable, and identifying the pixel window as being vertically stable, based at least in part on determining that each of the first plurality of columns, excluding the first column, is a constant column and based at least in part on setting the column flag associated with the first column. The determining the stability may further comprise determining a horizontal and vertical stability (HVStability) of the pixel window if all pixels in the pixel window have similar or identical values. The pixel window may include a plurality of rows and a plurality of columns, and wherein the determining the stability may further comprise determining that the pixel window is unstable if at least one row of the plurality of rows is not a constant row and at least one column of the plurality of columns is not a constant column.

There is also provided according to various embodiments, an apparatus comprising a target pixel and window selection module configured to select a pixel from an image data as a target pixel and to select a pixel window associated with the target pixel, a stability determination module configured to determine a stability of the pixel window, an address formulation module configured to formulate a look up table address based at least in part on the determined stability of the pixel window, and a processing module configured to obtain one or more image enhancement values from a look up table based at least in part on the formulated look up table address and to process the target pixel based at least in part on the obtained one or more image enhancement values. The stability determination module may be further configured to determine whether the pixel window is horizontally stable, vertically stable, horizontally and vertically stable, or unstable. The pixel window may include a plurality of rows, and wherein the stability determination module may be further configured to determine that the pixel window is horizontally stable if each of the plurality of rows is a constant row. The pixel window may include a plurality of columns, and wherein the stability determination module may be further configured to determine that the pixel window is vertically stable if each of the plurality of columns is a constant column. The pixel window may include a plurality of rows and a plurality of columns, and wherein the stability determination module may be further configured to determine that the pixel window is unstable if at least one row of the plurality of rows is not a constant row and at least one column of the plurality of columns is not a constant column. The stability determination module may be further configured to determine that the pixel window is horizontally and vertically stable if all pixels in the pixel window have similar or identical values.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIGS. 2a and 2b illustrate exemplary representations of a portion of image pixels of an image data, in accordance with various embodiments of the present invention;

FIG. 3 illustrates an exemplary pixel window, in accordance with various embodiments of the present invention;

FIGS. 4a-4f illustrate exemplary pixel windows, respectively, in accordance with various embodiments of the present invention.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

In various embodiments, for the purpose of this disclosure, the term printer may encompass one or more image printing devices that receive, from a client device (e.g., a personal computer, a camera, a fax machine, a server, and the like), a data stream representing an image and, from that data stream, print the represented image on a print medium, for example, a sheet of a paper. In various embodiments, the term print medium may encompass paper, paper-based products and sheets or planar sections of all other material on which an image may be printed. The term print medium may also encompass an intermediate transfer belt or similar device on which an image may be built up before being transferred to another print medium.

Figure 1:
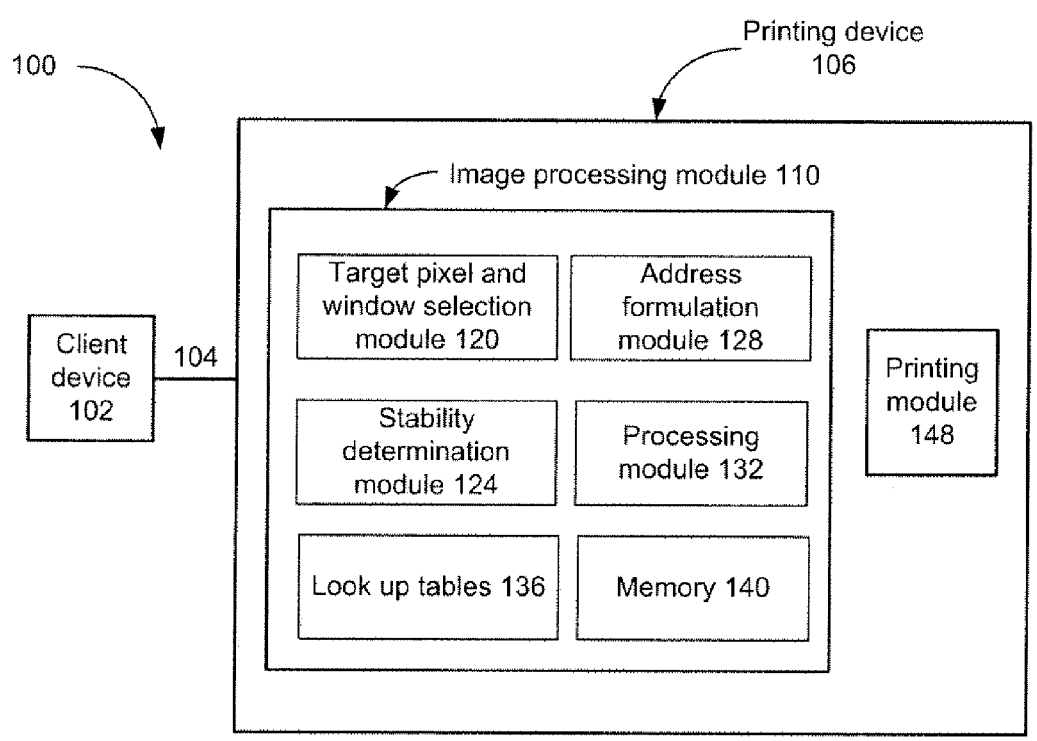
FIG. 1 schematically illustrates an exemplary printing system, in accordance with various embodiments of the present invention.

FIG. 1 schematically illustrates an exemplary printing system 100, in accordance with various embodiments of the present invention. In various embodiments, the printing system 100 includes a client device 102, such as a personal computer, a mainframe computer, a server, an universal serial bus (USB) drive, an USB device, a memory card, a scanner, a modem, a fax machine, a digital camera, a video camera, a security camera, a videocassette recorder, a digital videodisc, a laser disc player, a personal digital assistant, a wireless telephone, a mobile telephone, or any other device capable of generating, storing and/or transmitting image data for printing. The printing system 100 also includes a printing device 106, which may be a monochrome or color printer. In various embodiments, the printing device 106 may be a multi-function printer, i.e., may include other functionalities (e.g., scanning, faxing, copying, etc.) in addition to printing capabilities.

The client device 102 may be operatively coupled to the printing device 106 through a link 104. The client device 102 may transmit, over the link 104, image data in the form of print jobs to the printing device 106. In various embodiments, the link 104 may be a universal serial bus (USB) link, a Bluetooth link, a wired or wireless network connection (e.g., a local area network (LAN), a wide area network (WAN), an intranet, a home network, the Internet, and the like), a direct serial or parallel connection, etc.

In various embodiments, the client device 102 may run an application that generates image data representing an image that is to be printed by the printing device 106. The image data may be transmitted to a client printer driver (not illustrated in FIG. 1) installed in the client device 102. The client printer driver may configure the image data into a form appropriate for transmission to the printer 106 through link 104.

The printing device 106 may include an image processing module 110 and a printing module 148. In various embodiments, the image processing module 110 may process the image data received from the client device 102, and may transmit the processed image data to the printing module 148 for printing the image. The printing device 106 may also include several other components (not illustrated in FIG. 1) that are well known to those skilled in the art and are omitted for the purpose of clarity.

In various embodiments, the processing performed by the image processing module 110 may include formatting the image data, including performing one or more image enhancement processing. Such image enhancement processing, for example, may include artifact removal (e.g., toner explosion), single dot enhancement, red-eye removal, line enhancement, contrast enhancement, color enhancement, resolution enhancement, and so forth, as is well known to those skilled in the art. In various embodiments, the formatting and processing of the image data may include pixel-by-pixel processing of the image elements to optimize the image according to the particular characteristics of the printing device 106.

In various embodiments, the image processing module 106 may include a target pixel and window selection module 120, a stability determination module 124, an address formulation module 128, a processing module 132, one or more look up tables (LUTs) 136, and a main memory 140, each of which will be discussed in more details herein later. The image processing module 110 may also include several other components (not illustrated in FIG. 1) that are well known to those skilled in the art and are omitted for the purpose of clarity, e.g., a cache memory, an internal printer driver, a host interface controller, a memory controller, an image controller, a communication bus, etc. In various embodiments, although not illustrated in FIG. 1, the LUTs 136 may be stored in memory 140, in a cache of the processing module 132, and/or in any other appropriate storage element in the image processing module 110. In various embodiments, one or more components of the image processing module 110 may be included in an integrated circuit. Because such integrated circuits are usually customized for the particular printer characteristics, the integrated circuit may be an application specification integrated circuit (ASIC).

In various embodiments, image data (e.g., a full page of image data or multiple compressed strips of image data, the multiple strips representing a full page when decompressed and combined) may be transmitted from the client device 102 to the image processing module 110 of the printing device 106 over link 104, and may be stored in the memory 140. One or more components of the image processing module 110 may process (e.g., format the image data for one or more types of image enhancement procedures) the image data on a pixel by pixel basis, and store the processed image data in memory 140 (or in any other appropriate memory in the image processing module 110 or elsewhere in the printing device 106). Subsequently, the processed image data may be transmitted (possibly after further image processing operations by other components of the printing device 106, as is well known to those skilled in the art) to the printing module 148 for printing the image data in an appropriate printing medium.

In various embodiments, as discussed previously herein, the processing performed by the image processing module 110 may include pixel-by-pixel processing of the image elements to optimize and/or enhance the quality of the printed image. Certain pixel-by-pixel image processing procedures may utilize a LUT for quickly and consistently specifying the changes that are to be made to one or more pixel values. An exemplary LUT layout, for example, may utilize a 5 row by 5 column (i.e., 5×5) LUT in which the selected pixel to be processed (e.g., the target pixel) is in the center, surrounded by its neighboring pixels. The values of the neighboring pixels may then be compared to determine an address in the LUT, and that address in the LUT may specify the enhancement values to be given to the target pixel, as will be discussed in more details herein later.

FIG. 2a illustrates an exemplary representation of a portion 200 of image pixels of image data at the commencement of processing of the image data by the image processing module 110 of FIG. 1, in accordance with various embodiments of the present invention. In various embodiments, each small square represents a pixel, and the pixel 208 may be selected as a target pixel for processing by the image processing module 110. A pixel window 204 may be selected around the target pixel 208, illustrated by the shaded region in FIG. 2a. The pixel window 204 in FIG. 2a has a 5×5 size. That is, the target pixel 208 in FIG. 2a is surrounded by the pixel window 204 of dimension 5 rows by 5 columns. It should be readily apparent to those skilled in the art that any other appropriate size of the pixel window (e.g., 3×3, 5×3, 7×7, etc.) may also be used based at least in part on the type and model of the printing device 106, desired resolution and/or quality of the printed image, size of a printer memory, speed of printing, type of image enhancement procedure, etc. Also identified in FIG. 2a is pixel 209, which is a neighboring pixel to the target pixel 208.

Once the processing of the target pixel 208 is accomplished, another pixel (e.g., pixel 209 or any other appropriate neighboring pixel to the previous target pixel 208) may be selected as a target pixel, as illustrated in FIG. 2b. The pixel window may also be shifted accordingly so that the new target pixel 209 lies in the center of a new pixel window 204'.

The LUT for pixel windows, such as pixel windows 204 and 204', may be quite large. For example, to implement a full 5-row by 5-column LUT for one-bit data, there would be 33,554,432 (i.e., 2^25) entries in the LUT. For a smaller 3-row by 5-column pixel window, the number of entries in the LUT may still be large (e.g., 32,768 or 2^15).

In various embodiments, certain image processing procedures may have patterns that have constant (i.e., unchanging) values in several of the rows. For example, toner explosion, line enhancement, and single dot enhancement patterns may have constant values in a plurality of rows (e.g., four of the five rows of a pixel window). Thus, a significant reduction can be made in the number of LUT entries by adding a signal to indicate this "constant row values" condition. This may enable the number of table entries to be significantly and substantially reduced. Such a reduced LUT may relatively easily fit into even a small sized processor cache, thus enabling significant speed improvements to firmware image processing using relatively lower sized cache.

Many traditional printing devices usually print in portrait mode. For example, in a portrait mode printer, while printing on an 8.5"×11" paper, the smaller (i.e., 8.5") edge of the paper enters the printer first. However, some of the modern printers may utilize landscape mode printing (e.g., while printing on an 8.5"×11" paper, the larger (i.e., 11") edge of the paper enters the printer first) in addition to (or instead of) portrait mode printing. In various embodiments, printers that supports landscape mode printing may process image data in portrait mode within the printer (e.g., within the image processing unit 110) and rotate the image data prior to printing. Because of the rotation of the data prior to printing, constant column conditions may also be desired to be developed during image processing, which may translate to constant row conditions during actual printing of the image. Also, in various embodiments, certain image processing procedures may have patterns that have constant (i.e., unchanging) values in one or more of the columns as well. Accordingly, it may be advantageous to identify patterns that have constant values in several of the columns during the image processing process, which may further aid in reducing the LUT size.

FIG. 3 illustrates an exemplary pixel window 300, in accordance with various embodiments of the present invention. As illustrated, the pixel window 300 includes 5 rows and 5 columns of pixels, and each pixel in the pixel window 300 is identified by a respective reference character. For example, the pixels in the first (i.e., topmost) row of the pixel window 300 are identified as A1, . . . , A5. The target pixel (i.e., the pixel which may be processed by the image processing module 110) is C3, which lies in the center of the pixel window 300.

In various embodiments, for the purpose of this disclosure and unless otherwise stated, a row in a pixel window may be referred to as a "constant row" if all pixels in the row have similar or constant (i.e., unchanging) values. For example, referring again to FIG. 3, the fourth row of the pixel window 300 may be a constant row if (D1==D2==D3==D4==D5).

Similarly, in various embodiments, for the purpose of this disclosure and unless otherwise stated, a column in a pixel window may be referred to as a "constant column" if all pixels in the column have similar or constant (i.e., unchanging) values. For example, referring again to FIG. 3, the first column of the pixel window 300 may be a constant column if (A1==B1==C1==D1==E1).

In various embodiments, a pixel window (e.g., the pixel window 300 of FIG. 3) may be classified as a stable or an unstable pixel window based at least in part on the values of the pixels in the pixel window, as will be discussed in more details herein after. Additionally, a stable pixel window may be classified as horizontally stable (HStable), vertically stable (VStable), and/or horizontally and vertically stable (HVStable) pixel window.

In various embodiments, the pixel window 300 may be HStable if the following conditions are met:

$$\text{HStable:}[(A1==A2==A3==A4==A5) \text{ and}$$

$$(B1==B2==B3==B4==B5) \text{ and}$$

$$(C1==C2==C3==C4==C5) \text{ and}$$

$$(D1==D2==D3==D4==D5) \text{ and}$$

$$(E1==E2=E3==E4==E5)] \qquad \text{Equation 1.}$$

That is, the pixel window 300 may be HStable if for each row of the pixel window 300, all pixels in the row have a similar or constant (i.e., unchanging) value. Put differently, the pixel window 300 may be HStable if all the rows of the pixel window 300 are constant rows.

In various embodiments, the pixel window 300 may be VStable if the following conditions are met:

$$\text{VStable:}[(A1==B1==C1==D1==E1) \text{ and}$$

$$(A2==B2==C2==D2==E2) \text{ and}$$

$$(A3==B3=C3==D3==E3) \text{ and}$$

$$(A4==B4==C4==D4==E4) \text{ and}$$

$$(A5==B5=C5==D5==E5)] \qquad \text{Equation 2.}$$

That is, the pixel window 300 may be VStable if for each column of the pixel window, all pixels in the column has a similar or constant (i.e., unchanging) value. Put differently, the pixel window 300 may be VStable if all the columns of the pixel window 300 are constant columns.

In various embodiments, the pixel window 300 may be HVStable if all pixels in the pixel window 300 have the same value, i.e., HVStable:[$A1==A2==\ldots==A5==$ $B1==B2==\ldots==B5==$ $C1==C2==\ldots==C5=$ $D1==D2==\ldots==D5==$ $E1==E2==\ldots==E5$]                                      Equation 3.

Put differently, the pixel window 300 may be HVStable if all rows of the pixel window 300 are constant rows and all columns are constant columns.

If a pixel window is not HStable, VStable or HVStable, then the pixel window may be classified as unstable. Thus, the pixel window 300 is unstable if at least one row is not a constant row and at least one column is not a constant column.

In various embodiments, an LUT index an LUT address) for the pixel window 300 may be formulated based at least in part on determining a stability of the pixel window 300. For example, an 11 bit LUT address may be generated based on the stability of the pixel window 300, as follows:

If Unstable:{0,0,{$B2,B3,B4$},{$C2,C3,C4$},{$D2,D3,D4$}};

If HStable:{0,1,{row[1],col[1]},{$A3,B3,C3,D3,E3$}, (row[0],col[0])};

If VStable:{1,0,{row[1],col[1]},{$C1,C2,C3,C4,C5$}, (row[0],col[0])}; and

If HVStable:{1,1,0,0,0,0,$C3$,row[0],col[0]),{row[1], col[1]}}                              Equation 4.

Thus, the first two bits in the LUT address may identify the stability of the pixel window 300. For example, a {0, 0, . . . } may indicate an unstable pixel window, a {0, 1, . . . } may indicate a HStable window, and so on, as disclosed in equation 4. The row & column indicators in the LUT addresses of equation 4 may refer to the lower bits of the indices of the location of the pixel window in the image, and may be used to identify the pixel window that is under consideration. This may, for example, ensure that the image enhancement values received from the appropriate address in the LUT is applied to the correct pixels. Thus, in various embodiments, for a HStable pixel window, as all the rows are constant rows, it may be sufficient to include only one pixel value from each row (e.g., A3, B3, C3, D3, and E3) in the corresponding LUT address, as disclosed in equation 4. Similarly, for a VStable pixel window, all the columns are constant columns, and accordingly, it may be sufficient to include only one pixel value from each column (e.g., C1, C2, C3, C4, and C5) in the corresponding LUT address. For a HVStable pixel window, all pixels have the same value, and accordingly, it may be sufficient to include any one pixel value (e.g., C3) from the pixel window in the corresponding LUT address, as disclosed in equation 4.

On the other hand, an unstable pixel window may not have any particular pattern of pixel values, and hence, all pixel values may be required in the LUT address. For the sake of simplicity (e.g., to reduce the LUT size), in various embodiments, for unstable windows, pixel values of only a part of the pixel window (instead of the full pixel window) may be included in the LUT address. Accordingly, pixel values {B2, B3, B4}, {C2, C3, C4}, {D2, D3, D4} (i.e., pixel values of pixels of a 3×3 pixel window surrounding the target pixel C3) may be included in the corresponding LUT address, as disclosed in equation 4.

As will be readily understood by those skilled in the art based upon the disclosure and teachings provided herein, the form of the LUT address in equation 4 is purely exemplary in nature, and other appropriate forms of the LUT address may also be formulated. For example, for an unstable pixel window, pixel values of the full 5×5 window may be included in the pixel window (although such inclusion may marginally increase the quality of image enhancement processing, there may also be an increase in number of bits in the LUT address and a proportional increase the size of the LUT table). In another example, for an unstable pixel window, pixel values of the full 5×5 window, excluding the outside corner pixels (e.g., pixels A1 A5, E1 and/or E5 in pixel window 300), may be included in the pixel window As disclosed in equation 4, in various embodiments, the LUT address may be of 11 bits, and accordingly, the consolidated 5-row by 5-column LUT corresponding to the LUT address of equation 4 may have 2048 (i.e., $2^{11}$) entries only. Thus, the composite or consolidated LUT for 4-bit image enhancement values may be a $2^{11} \times 4$ bit (i.e., 1024 byte) table. For 2-bit image enhancement values the consolidated LUT may be a $2^{11} \times 2$ bit (i.e., 512 byte) table.

In contrast, a full 5-row by 5-column conventional LUT may have 33,554,432 (i.e., $2^{25}$) entries. Thus, a full 5-row by 5-column conventional LUT for 4 bit image enhancement values may be a $2^{25} \times 4$ bit (i.e., 16,777,216 byte) table; and for 2-bit image enhancement, the LUT may be a $2^{25} \times 2$ bit (i.e., 8,388,608 byte) table.

Thus, the consolidated LUT corresponding to the LUT address of equation 4 may be significantly smaller than a conventional LUT of comparable size. A smaller sized LUT may result in smaller memory size necessary to store the LUT, and a smaller sized LUT may also be loaded in a cache (not illustrated in FIG. 1) of the image processing module 110, thereby significantly speeding the image processing. Additionally, by using the LUT addresses of equation 4, the corresponding matching window patterns in the LUT may be speedily accessed, thereby further speeding the image processing.

FIGS. 4a-4f illustrate exemplary pixel windows 400a-400f, respectively, in accordance with various embodiments of the present invention. Referring to the pixel window 400a of FIG. 4a, the first row (starting from the top) of the window includes zeros (0's) only and hence, is a constant row. Similarly, each of the other rows of the window 400a is also constant rows, and hence, pixel window 400a is HStable. On the other hand, as none of the columns of the window 400a is constant column, the window 400a is not VStable and/or HVStable. According to equation 4, the LUT address of the HStable pixel window 400a may be given by {0, 1, row[1], col[1], 0, 0, 0, 1, 1, row[0], col[0]}.

Figures 4A, 4B, 4C, 4D, 4E, 4F:
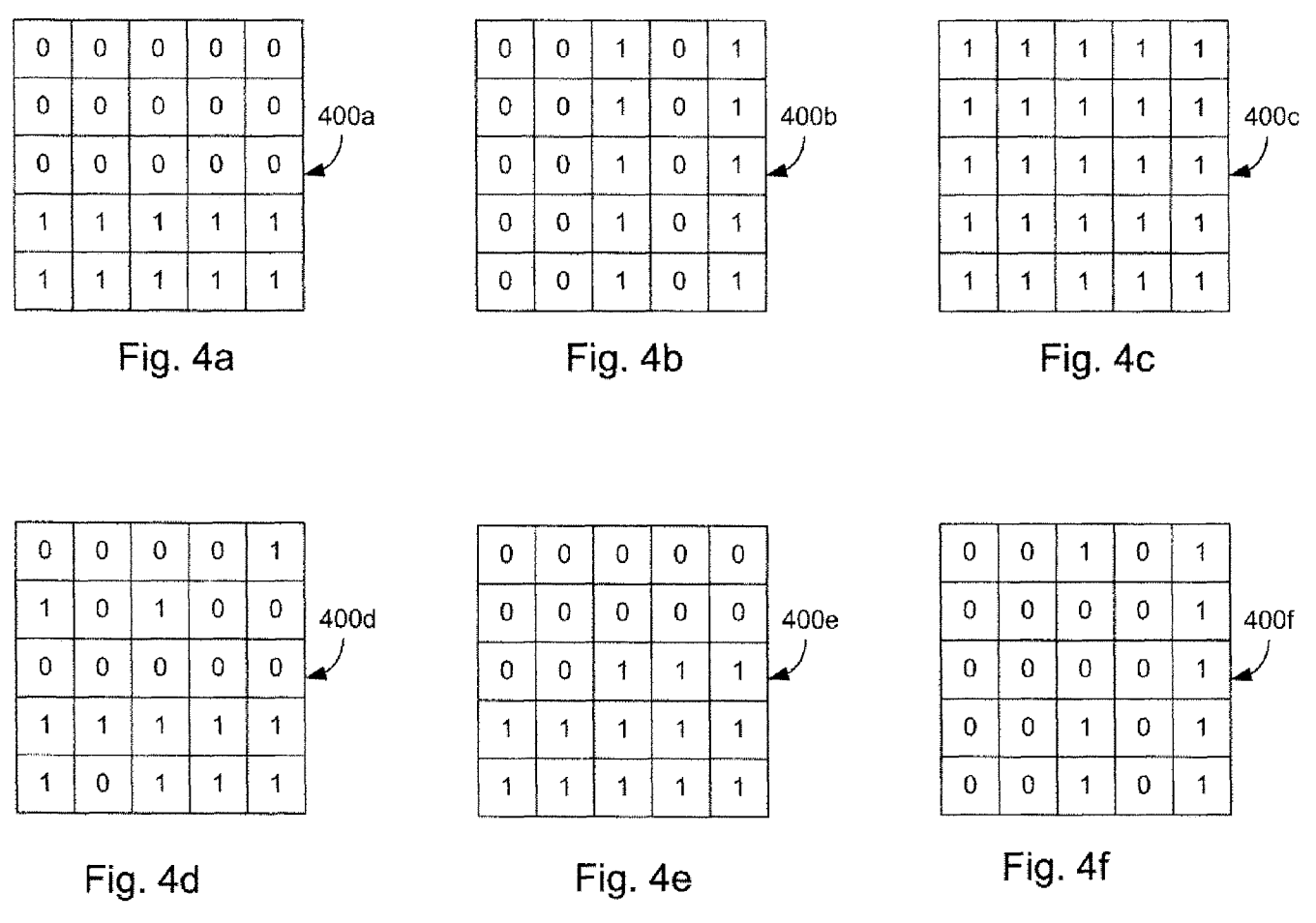

Referring to the pixel window 400b of FIG. 4b, the first, second and fourth columns (starting from the left) include 0's only and hence, are constant columns. Similarly, the third and fifth columns include 1's only, and hence, are also constant columns. However, none of the rows are constant rows. Hence, pixel window 400b is VStable, but not HStable and/or HVStable. According to equation 4, the LUT address of the VStable pixel window 400b may be given by {1, 0, row[1], col[1], 0, 0, 1, 0, 1, row[0], col[0]}.

Referring to the pixel window 400c of FIG. 4c, all the pixels have 1's i.e., all rows and columns are constant rows and constant columns, respectively. Hence, pixel window 400c is HVStable. According to equation 4, the corresponding LUT address may be given by {1, 1, 0, 0, 0, 0, 1, row[1], col[1], row[0], col[0]}. As will be readily understood by those skilled in the art based on the teachings provided herein, a HV stable pixel window may also be classified as vertically stable and/or horizontally stable. Accordingly, the LUT address of pixel window 400c may also be given by {1, 0, row[1], col[1], 1, 1, 1, 1, 1, row[0], col[0]} and/or {0, 1, row[1], col[1], 1, 1, 1, 1, row[0], col[0]}.

Referring to the pixel window 400d of FIG. 4d, none of the columns are constant columns. Moreover, although the third and fourth rows are constant rows, other rows (i.e., the first, second and fifth rows) are not constant rows. That is, pixel window 400d includes at least one row and one column that are not constant row and constant column, respectively, and hence, pixel window 400d is an unstable pixel window. According to equation 4, the corresponding LUT address may be given by {0, 0, 0, 1, 0, 0, 0, 0, 1, 1, 1}.

As will be readily understood by those skilled in the art based upon the disclosure and teachings provided herein, pixel windows 400e and 400f of FIGS. 4e and 4f, respectively, are also unstable pixel windows as each of these two pixel windows includes at least one row and one column that are not constant row and constant column, respectively. According to equation 4, the LUT addresses of the unstable pixel windows 400e and 400f may be given by {0, 0, 0, 0, 0, 0, 1, 1, 1, 1, 1} and {0, 0, 0, 0, 0, 0, 0, 0, 0, 1, 0}, respectively.

In various embodiments, the stability criterion previously discussed herein may be extended or relaxed in several ways. For example, the previously discussed criteria for HStability (equation 1) required that each row of a pixel window be a constant row and the criteria for VStability (equation 2) required that each column of a pixel window be a constant column. In various embodiments, these stability criteria may be further extended to require only a subset of rows or columns to be constant rows or columns, respectively.

Thus, a modified criteria for HStable may not require all rows to be constant rows; rather, only one or more constant rows (but not necessary all) may be required to classify a pixel window as HStable. For example, in various embodiments, for a 5×5 pixel window, only the first, second, fourth and fifth row may be required to be constant rows for the pixel window to be classified as HStable. That is, according to this modified HStability criterion, the pixel values of the third row (i.e., the row that includes the target pixel) may not necessarily be taken into account. Thus, the modified HStability criteria may be:

HStable:[($A1==A2==A3==A4==A5$) and ($B1==B2==B3==B4==B5$) and ($D1==D2==D3==D4==D5$) and ($E1==E2==E3==E4==E5$)].     Equation 5.

In various embodiments, an appropriate condition flag in a configuration register may be set to indicate the modified horizontal stability criterion. With the inclusion of the condition flag, the modified HStability criteria may be:

HStable:[(($A1==A2==A3==A4==A5$)|$Cfg\_HIgnoreRow1$) and (($B1==B2==B3==B4==B5$)|$Cfg\_HInoreRow2$) and (($C1==C2==C3==C4==C5$)|$Cfg\_HInoreRow3$) and (($D1==D2==D3==D4==D5$)|$Cfg\_HIgnoreRow4$) and (($E1==E2==E3==E4==E5$)|$Cfg\_HIgnoreRow5$)}    Equation 6.

Thus, the Cfg_HIgnoreRow flag for any row may be set to indicate that the constant row condition for that row is to be ignored while determining the HStability for the pixel window. For example, if it is desired to ignore the third row while determining the HStability (as disclosed in equation 5), the Cfg_HIgnoreRow3 flag may be set to indicate such condition, and in that case, the HStability function may not depend on the pixel data from row 3. Thus, according to the modified HStability criteria of equation 6, the pixel window 400e of FIG. 4e may be classified as HStable (as all the rows, except the third row, are constant rows), with Cfg_HIgnoreRow3 flag set to 1.

As will be readily appreciated by those skilled in the art based upon the disclosure and teachings provided herein, in various embodiments, the VStability criteria may also be extended by not requiring one or more columns (e.g., the third column of a 5×5 pixel window) to be constant columns and/or by appropriately setting a Cfg_VIgnoreColumn for one or more columns. For example, the modified VStability criteria may be derived from equation 2 as follows:

VStable:[(($A1==B1==C1==D1==E1$)|$Cfg\_VIgnoreCol1$) and (($A2=B2==C2==D2==E2$)|$Cfg\_VIgnoreCol2$) and (($A3==B3==C3==D3==E3$)|$Cfg\_VIgnoreCol3$) and (($A4==B4==C4==D4==E4$)|$Cfg\_VIgnoreCol4$) and (($A5==B5==C5==D5==E5$)|$Cfg\_VIgnoreCol5$)]    Equation 7.

Thus, the Cfg_VIgnoreCol flag for any column may be set to indicate that the constant column condition for that column may be ignored while determining the VStability for the pixel window. For example, if it is desired to ignore the third column while determining the VStability, the Cfg_VIgnoreCol3 flag may be set to indicate such condition, and in that case, the VStability function may not depend on the pixel data from column 3. Thus, according to the modified VStability criteria of equation 7, the pixel window 400f of FIG. 4f may be classified as VStable (as all the columns, except the third columns, are constant columns), with Cfg_VIgnoreCol3 flag set to 1.

Although in some embodiments, the pixels have been assumed to single bit pixels, in various embodiments, the inventive principles may be readily extended to multi-bit pixels (e.g., 2 bits per pixel, 4 bits per pixel, etc.) as well, although this may result in a relatively large sized LUT. In order to avoid a relatively large sized LUT, while using multi-bit pixels, for example, a relatively smaller sized pixel window (e.g., 3×3) may be considered, one or more pixels (e.g., the corner pixels) in the pixel windows may not be considered, and/or only the most significant bit (or at least not all the bits) of one or more pixels (e.g., the corner pixels) in the pixel window may be considered while generating the LUT address.

Figure 5:
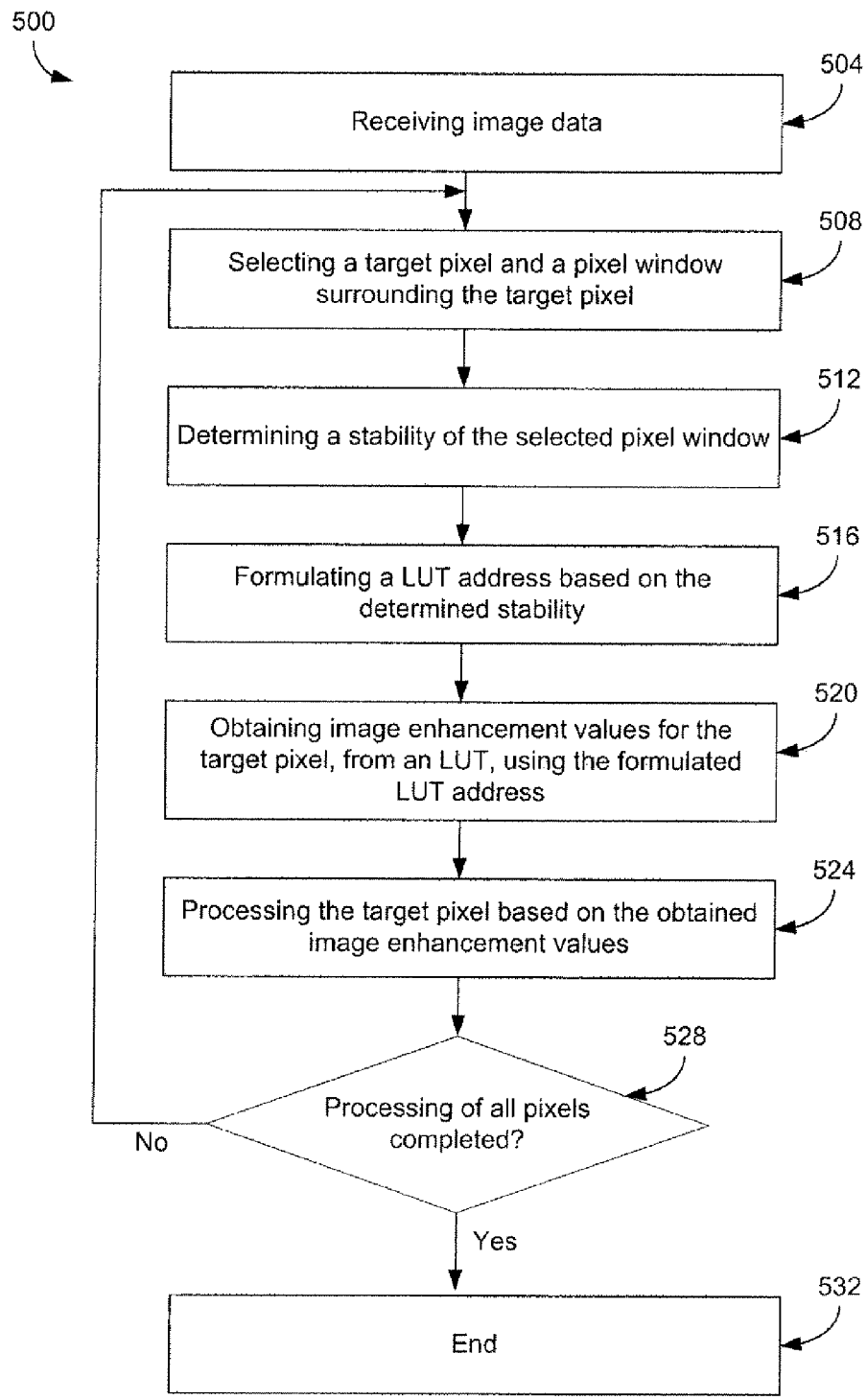
FIG. 5 illustrates an exemplary method for processing image data, in accordance with various embodiments of the present invention.

FIG. 5 illustrates an exemplary method 500 for processing image data, in accordance with various embodiments of the present invention. As previously discussed herein, processing image data may include one or more image enhancement procedures utilized and employed in image processing for image printing and/or display. In various embodiments, such image enhancement procedures may include, for example, Single Dot enhancement procedure, Toner Explosion Top enhancement procedure, Toner Explosion Bottom enhancement procedure, Line Enhancement Bottom procedure, Line Enhancement Top procedure, image resolution enhancement procedure, Red Eye removal procedure, artifact removal procedure, contrast enhancement procedure, color enhancement procedure, and a combination thereof.

Referring again to FIGS. 1, 2a, 2b, 3 and 5, the method 500 may include, at 504, receiving image data. Thus, the image processing module 110 of FIG. 1 may receive the image data from the client device 102 over link 104. For example, FIG. 2a illustrates an exemplary portion 200 of image data received by the image processing module 110.

At 508, the target pixel and window selection module 120 of FIG. 1 may select a target pixel from the image data and a pixel window around the target pixel. For example, FIG. 2a illustrates a target pixel 208 and an associated pixel window 204 (illustrated by the shaded portion in FIG. 2a).

At 512, the stability determination module 124 of FIG. 1 may determine a stability of the selected pixel window. That is, the stability determination module 124 may determine whether the pixel window is unstable, HStable, VStable or HVStable, as has been previously discussed herein. In various embodiments, at 516, the address formulation module 128 may formulate a LUT address based at least in part on the stability of the pixel window. Exemplary techniques for formulating the LUT address have been discussed previously, for example, with respect to equation 4. In various embodiments, at 520, the processing module 132 may obtain image enhancement values for the target pixel from LUT 136 using the LUT address, and at 524, process the target pixel based at least in part on the obtained image enhancement values.

Once the processing of the target pixel is complete, the target pixel and window selection module 120 may determine, at 528, if all pixels in the image data have been processed. If not, the target pixel and window selection module 120 may select another pixel as a target pixel and also select an associated pixel window. For example, referring to FIG. 2a, once the processing of pixel 208 is complete, pixel 209 may be selected as a target pixel (see FIG. 2b) and an associated pixel window may be selected at 508. Once processing of all pixels in the image data is complete, the processing of the received image data may be complete at 532. In case the target pixel is at or near an edge of an image, it may not be possible to select a pixel window (e.g., a 5×5 pixel window) that fully surrounds the pixel. In this case, for example, a pixel window may be selected such that the missing pixels in the pixel window may be assumed to have a certain value (e.g., 0).

In various embodiments, classification of pixel windows as HStable, VStable, HVStable and unstable, and formulating a composite and consolidated LUT address based on such stability classification have several advantages, including substantial reduction in the size of the LUT. Such a reduced LUT may relatively easily fit in a cache of an image processing unit in a printing device, thereby increasing the image processing speed. Modifying the stability criteria (as discussed with respect to equations 6 and 7) may provide additional flexibility in defining the stability criterion, further reduce the LUT size, and/or increase the processing speed. In various embodiments, development of both the horizontal stability and vertical stability criteria may have several additional advantages (e.g., such stability criteria may be used in both portrait mode printers and landscape mode printers).

Some of the inventive principles disclosed herein in some of the embodiments may be applicable not only for image processing in printing devices, but also for image processing in other image generation and display devices, including bit not limited to computer displays, cell phones, digital cameras, video cameras, personal digital assistants, consumer electronics devices that includes a display, etc.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A method comprising:
   selecting a pixel window of image data, wherein the pixel window includes a target pixel;
   determining at least one of a horizontal stability of the pixel window and/or a vertical stability of the pixel window;
   based at least in part on the horizontal stability of the pixel window and/or the vertical stability of the pixel window, formulating a look up table address;
   based at least in part on the look up table address, obtaining one or more image enhancement values from a look up table; and
   based at least in part on the one or more image enhancement values obtained from the look up table, processing the target pixel in the pixel window.

2. The method of claim 1, wherein the determining the at least one of a horizontal stability of the pixel window and/or a vertical stability of the pixel window further comprises:
   determining whether the pixel window is horizontally stable (HStable), vertically stable (VStable), horizontally and vertically stable (HVStable), or unstable.

3. The method of claim 2, wherein the pixel window includes five rows and five columns, and wherein:
   if the pixel window is unstable, the formulated look up table address has the form {0, 0, {B2, B3, B4}, {C2, C3, C4}, {D2, D3, D4}};
   if the pixel window is horizontally stable, the formulated look up table address has the form {0, 1, {row[1], col[1]}, {A3, B3, C3, D3, E3}, {row[0], col[0]}};
   if the pixel window is vertically stable, the formulated look up table address has the form {1, 0, {row[1], col[1]}, {C1, C2, C3, C4, C5}, {row[0], col[0]}}; and
   if the pixel window is horizontally and vertically stable, the formulated look up table address has the form {1, 1, 0, 0, 0, 0, C3, {row[1], col[1]}, {row[0], col[0]}}.

4. The method of claim 1, wherein the pixel window includes a plurality of rows, and wherein the determining at least one of a horizontal stability of the pixel window and/or a vertical stability of the pixel window further comprises:
   if each of the plurality of rows is a constant row, determining a horizontal stability of the pixel window.

5. The method of claim 1, wherein the pixel window includes a first row and a first plurality of rows, wherein the first row includes the target pixel, wherein the first plurality of rows excludes the first row, and wherein the determining at least one of a horizontal stability of the pixel window and/or a vertical stability of the pixel window further comprises:
   if each of the first plurality of rows is a constant row, determining a horizontal stability of the pixel window.

6. The method of claim 5, further comprising setting a row flag associated with the first row, wherein the row flag indicates that the first row does not necessarily need to be a constant row in order for the pixel window to be horizontally stable.

7. The method of claim 1, wherein the pixel window includes a first plurality of rows including a first row, and wherein the determining at least one of a horizontal stability of the pixel window and/or a vertical stability of the pixel window further comprises:
  determining that each of the first plurality of rows, excluding the first row, is a constant row;
  setting a row flag associated with the first row, wherein the row flag indicates that the first row does not necessarily need to be a constant row in order for the pixel window to be horizontally stable; and
  based at least in part on (i) determining that each of the first plurality of rows, excluding the first row, is a constant row, and (ii) setting the row flag associated with the first row, identifying the pixel window as being horizontally stable.

8. The method of claim 1, wherein the pixel window includes a plurality of columns, and wherein the determining at least one of a horizontal stability of the pixel window and/or a vertical stability of the pixel window further comprises:
  if each of the plurality of columns is a constant column, determining a vertical stability of the pixel window.

9. The method of claim 1, wherein the pixel window includes a first column and a first plurality of columns, wherein the first column includes the target pixel, wherein the first plurality of columns excludes the first column, and wherein the determining at least one of a horizontal stability of the pixel window and/or a vertical stability of the pixel window further comprises:
  if each of the plurality of first columns is a constant column, determining a vertical stability of the pixel window.

10. The method of claim 1, wherein the pixel window includes a first plurality of columns including a first column, and wherein the determining at least one of a horizontal stability of the pixel window and/or a vertical stability of the pixel window further comprises:
  determining that each of the first plurality of columns, excluding the first column, is a constant column;
  setting a column flag associated with the first column, wherein the column flag indicates that the first column does not necessarily need to be a constant row in order for the pixel window to be vertically stable; and
  based at least in part on (i) determining that each of the first plurality of columns, excluding the first column, is a constant column, and (ii) setting the column flag associated with the first column, identifying the pixel window as being vertically stable.

11. The method of claim 1, wherein the determining at least one of a horizontal stability of the pixel window and/or a vertical stability of the pixel window further comprises:
  if all pixels in the pixel window have similar or identical values, determining a horizontal and vertical stability (HVStability) of the pixel window.

12. The method of claim 1, wherein the pixel window includes a plurality of rows and a plurality of columns, and wherein the determining at least one of a horizontal stability of the pixel window and/or a vertical stability of the pixel window further comprises:
  if (i) at least one row of the plurality of rows is not a constant row, and (ii) at least one column of the plurality of columns is not a constant column, determining that the pixel window is unstable.

13. The method of claim 1, wherein the look up table includes at least an enhancement procedure that provides the one or more image enhancement values, and wherein the enhancement procedure is selected from a Single Dot enhancement procedure, a Toner Explosion Top enhancement procedure, a Toner Explosion Bottom enhancement procedure, a Line Enhancement Bottom procedure, a Line Enhancement Top procedure, or a combination thereof.

14. A printing device comprising an apparatus that includes:
  a target pixel and window selection module configured to select a pixel from an image data as a target pixel and to select a pixel window associated with the target pixel;
  a stability determination module configured to determine whether the pixel window is (i) horizontally stable, (ii) vertically stable, (iii) horizontally stable and vertically stable, or (iv) unstable;
  an address formulation module configured to formulate a look up table address based at least in part on the stability of the pixel window; and
  a processing module configured to
    obtain one or more image enhancement values from a look up table based at least in part on the look up table address, and
    process the target pixel based at least in part on the one or more image enhancement values obtained from the look up table.

15. The printing device of claim 14, wherein the pixel window includes a plurality of rows, and wherein the stability determination module is further configured to determine, if each of the plurality of rows is a constant row, that the pixel window is horizontally stable.

16. The printing device of claim 14, wherein the pixel window includes a plurality of columns, and wherein the stability determination module is further configured to determine, if each of the plurality of columns is a constant column, that the pixel window is vertically stable.

17. The printing device of claim 14, wherein the pixel window includes a plurality of rows and a plurality of columns, and wherein the stability determination module is further configured to determine, if (i) at least one row of the plurality of rows is not a constant row, and (ii) at least one column of the plurality of columns is not a constant column, that the pixel window is unstable.

18. The printing device of claim 14, wherein the stability determination module is further configured to determine, if all pixels in the pixel window have similar or identical values, that the pixel window is horizontally and vertically stable.

19. The printing device of claim 14, wherein the address formulation module is further configured to:
  if the pixel window is unstable, formulate the lookup table address in the form {0, 0, {B2, B3, B4}, {C2, C3, C4}, {D2, D3, D4}};
  if the pixel window is horizontally stable, formulate the lookup table address in the form {0, 1, {row[1], col[1]}, {A3, B3, C3, D3, E3}, {row[0], col[0]}};
  if the pixel window is vertically stable, formulate the lookup table address in the form {1, 0, {row[1], col[1]}, {C1, C2, C3, C4, C5}, {row[0], col[0]}}, and
  if the pixel window is horizontally and vertically stable, formulate the lookup table address in the form {1, 1, 0, 0, 0, 0, C3, {row[1], col[1]}, {row[0], col[0]}}.

20. The printing device of claim 14, wherein the look up table includes at least an enhancement procedure that provides the one or more image enhancement values, and wherein the enhancement procedure is selected from a Single Dot enhancement procedure, a Toner Explosion Top enhancement procedure, a Toner Explosion Bottom enhancement procedure, a Line Enhancement Bottom procedure, a Line Enhancement Top procedure, or a combination thereof.

\* \* \* \* \*